United States Patent Office 3,148,022
Patented Sept. 8, 1964

3,148,022
PROCESS FOR EXTRACTING BERYLLIUM
VALUES FROM ORES
Jurgen Max Kruse, Pitman, N.J., assignor to E. I. du Pont de Nemours and Company, Wilmington, Del., a corporation of Delaware
No Drawing. Filed Oct. 17, 1961, Ser. No. 145,740
4 Claims. (Cl. 23—15)

This invention relates to a method for extracting beryllium from its ores. More particularly, this invention relates to a method for extracting beryllium from non-pegmatic ores.

Beryllium is a strong, light-weight metal which is receiving much attention as a material of construction, particularly in the fields of nuclear reactors and space vehicles. However, there are serious deterrents to its use in large amounts, one of which is the limited supply currently available to fabricators of the metal. The supply currently is produced from beryl crystals hand-sorted from pegmatite deposits, which deposits are characteristically irregular, small, and generally not amenable to large tonnage production. The development of large deposits of non-pegmatite beryllium ores could permit large scale production of the metal. However, previous attempts to extract beryllium from these ores have involved complex multistage chemical processes and expensive reagents and have required extensive pretreatment of the ore and complex recovery and separation techniques due to the co-extraction of large quantities of aluminum, magnesium and ferric values which are present to a large extent in all beryllium-containing ores.

In accordance with this invention there is provided a surprisingly simple and efficient process for the selective extraction of beryllium values from beryllium-containing ores, particularly from non-pegmatic ores, which does not necessitate pretreatment of the ore nor extensive product separation techniques. This process comprises contacting the ore, in a finely divided form, with sulfur trioxide gas at a temperature between about 560° C. and about 750° C., slurrying the sulfatized ore with an aqueous leach solution, adjusting the pH of the slurry to a value between about 2.5 and about 4.0, and separating the pregnant leach solution containing dissolved beryllium values from the insoluble residue.

The ore will be in a finely divided state, i.e., less than about 100 mesh, to provide a larger surface area for contact with the sulfur trioxide. This sizing may be made by any conventional method such as grinding followed by screening or hydraulic classification. Additionally, although no other treatment is needed and does not constitute a part of this invention, magnetic minerals such as magnetite may be removed as, for example, by an electromagnet to facilitate handling of the ore and to prevent sulfatization of ferrous values.

By the term sulfatize as used herein is meant to convert the values of an element, i.e., beryllium, to the sulfate form.

By the term "pregnant leach solution" as used herein is meant a leach solution which is enriched in the values to be recovered, i.e., beryllium.

The sulfatization step is accomplished by bringing sulfur trioxide gas into intimate contact with the ore. The gas may be passed upwardly through a bed of the ore to produce a fluidized bed system, in which case the gas stream serves as an agitating means to insure intimate contact of the gaseous sulfur trioxide with all of the ore. Additional agitating means may be provided, e.g., rabble arms or a rotary furnace, while the gas is passed over the ore, but such are not critical to the invention. Generally, the sulfur trioxide gas will be in admixture with a non-reducing diluent gas such as air, oxygen, nitrogen, carbon dioxide, an inert gas, etc. for ease in handling. The concentration of the sulfur trioxide is not critical, nor is the passage of excess quantity through the ore. Instead of introducing sulfur trioxide per se in the sulfatizing step, the sulfur trioxide may be produced in situ by passing a mixture of sulfur dioxide with air or oxygen over the ore. At the sulfatization temperatures used, i.e., 560–750° C., reaction of sulfur dioxide with oxygen forms sulfur trioxide.

The sulfatization is effected at temperatures ranging from about 560° C. to about 750° C. At temperatures below about 560° C., sulfur trioxide is consumed by aluminum, which is generally prevalent in beryllium-containing ores, with the formation of aluminum sulfate, $Al_2(SO_4)_3$. At temperatures above about 560° C., aluminum sulfate dissociates to form basic aluminum sulfate and at higher temperatures, the basic sulfate dissociates to water-insoluble aluminum oxide. Thus to reduce the amount of sulfur trioxide consumed by the aluminum in the ore and, consequently, the formation of water-soluble aluminum sulfate, it is desirable to operate at as high a temperature as possible without decomposition of sulfur trioxide which takes place above about 750° C. Particularly preferred sulfatization temperatures are between 580° C. and 650° C.

In the sulfatization step, the ore is treated with sulfur trioxide gas for a minimum of three minutes. Time and temperature are interdependent in this sulfatization, the higher the temperature used, the shorter the requisite reaction time within limits of operability of the process. The practical minimum time is about three minutes. A sulfatization time of less than three minutes at the highest feasible temperature is generally unfeasible on a commercial scale and results in incomplete solubilization of the beryllium values of the ore. The practical maximum time is about 30 minutes. Continued contact after that length of time results in the solubilization of additional amounts of alkaline and alkaline earth metals without increasing the conversion to beryllium sulfate.

The sulfatized product is removed from the sulfatizing zone and leached with water to extract soluble beryllium sulfate from the insoluble compounds in the sulfatized product. The amount of leach solution employed with respect to the sulfatized product is not critical as long as sufficient liquid is present that it does not become saturated with the soluble material. Since the amount of soluble material present constitutes a very small proportion of the treated ore, an amount of water sufficient to permit ready separation of the pregnant leach solution from the insoluble material by filtration or decantation is suitable. In large-scale operation, the leaching normally will be effected in a continuous manner by feeding a stream of the sulfatized ore into a counter-current stream of water. To obtain a pregnant leach containing sufficient beryllium to make recovery from solution economically attractive, the stream of sulfatized ore will move more rapidly than the countercurrent stream of water. In batch operation, the beryllium concentration in the pregnant leach solution is increased by using one portion of water to leach several portions of the ore by batch counter-current techniques. At any given time, in either continuous or batch leaching, the leach slurry preferably consists of about one part by weight of sulfatized ore in about 3 to about 6 parts by weight of leach solution. If the pH of the slurry is below about 2.0 prior to separation of pregnant leach solution from the residue, appreciable quantities of aluminum, iron and magnesium values are extracted. At pH values above about 4.5, poor separation of beryllium results. It is preferred that the pH of the slurry be adjusted, by conventional means, to 2.1 to 3.7.

In addition to beryllium sulfate, relatively small amounts of other water-soluble sulfates, e.g., magnesium sulfate, aluminum sulfate, alkali metal sulfates, and alkaline-earth metal sulfates, also may be dissolved in the leach solution. If present, these impurities may be conveniently separated from the pregnant leach solution by standard procedures. A particularly preferred method involves contacting the solution with an ion-exchange resin, e.g., a carboxylic acid-type synthetic resin cation exchanger (e.g., "Amberlite" IRC–50, commercially available from Rohm and Haas) and selectively eluting the beryllium values from the resin, for example, with 0.2–0.3 molar sodium sulfate or sodium chloride, with 0.1 normal hydrochloric acid, with sulfoasalicyclic acid, etc. The ion-exchange column may be regenerated simply by treatment with more concentrated $Na_2SO_4$ or other sodium salts. Beryllium values can be removed from alkaline materials which may also be present in small quantities in the eluate by precipitation as the hydroxide.

As above, the beryllium values are recovered by alkaline precipitation or other methods well known to the art, e.g., solvent extraction.

Advantageously, the beryllium is maintained in solution throughout the process so that direct contact with toxic beryllium compounds and the inhalation of fumes is avoided.

The following examples illustrate the invention. Percentages and parts, where given, are by weight.

*Example 1*

A sample of montmorillonite clay

[(Mg, Ca)O·$Al_2O_3$·$5SiO_3$·$nH_2O$]

from a bentonized rhyolitic (vitric-crystal) tuff containing about 0.2% beryllium by weight was ground until the particles were less than 100 mesh. A ten gram sample of the clay was heated in a reactor tube and was fluidized in a stream of sulfur trioxide and air. The temperature of the clay was maintained at about 600° C. during the sulfatization. At the end of a thirty-minute period, the flow of sulfur trioxide was terminated and the sulfatized product was slurried in 200 parts water at 60–80° C. for two hours. The pH of the slurry was 2.2. The slurry was filtered, and the filter cake washed with water. The wash water and the filtrate were combined, and the combined liquids were contacted with the sodium form of carboxylic acid-type cation exchange resin ("Amberlite" IRC–50, commercially available from Rohm and Haas). The beryllium values were eluted from the resin by washing with a 0.4 molar solution of sodium sulfate. Analysis of the elutant by means of the p-nitrobenzene azo-orcinol method described in Analytical Chemistry, volume 28, page 957, revealed that the 0.0170 part of beryllium had been extracted (85% recovery). The leach solution was found to contain less than 20 mg. aluminum and magnesium, whereas the eluate contained only beryllium and the sodium sulfate.

*Example 2*

The method of Example 1 was followed in a number of runs, with the exception that sulfatization temperatures and contact times were varied as shown in the table below. In all cases, a 10 part sample of Utah montmorillonite containing 0.2% beryllium by weight was used. The percentage beryllium recovered was determined by emission spectographic measurement of residual solids.

| Run | Sulfatization | | Leach pH | Beryllium Recovery | | Contamination in Leach | |
|-----|---------------|---|---------|--------------------|---|------------------------|---|
|     | Time (min.) | Temperature (° C.) |   | Mg. | Percent | Al(mg.) | Mg (mg.) |
| A | 30 | 590 | 2.2 | >50 | >90 | -------- | -------- |
| B | 12 | 590 | 2.8 | 51  | >90 | -------- | -------- |
| C | 20 | 570 | 2.7 | 49  | >95 | -------- | -------- |
| D | 7  | 620–740 | 2.2 | 44 | -------- | 28 | <10 |
| E | 3  | 600–690 | 2.1 | 39 | -------- | 34 | ~3 |

Additionally, good recovery of beryllium was obtained in high-spot runs from ores containing beryllium in the form of phenacite, bertrandite, and beryl.

*Example 3*

Ten parts of a magnetic ore containing 0.056 part beryllium in the form of helvite [3(Be, Mn, Fe)$_2SiO_4$(Mn, Fe)S], as determined by spectroscopic analysis, was contacted with an electromagnet to remove magnetic material. The demagnetized sample was placed in a reactor tube, heated to 670° C., and was fluidized in a stream of sulfur dioxide and air for 30 minutes. The treated ore was slurried in 200 parts water for two hours at 70° C. The pH of the slurry was 3.7. The slurry was filtered, and the filter cake was washed with water. The combined filtrate and wash water then were contacted with the sodium form of a carboxylic acid-type cation exchange resin. The eluant was analyzed for beryllium values as in Example 1. The eluant was found to contain 0.042 part beryllium (75% recovery) and to be substantially free of aluminum and magnesium values.

The invention has been described in detail in the foregoing. However, it will be apparent to those skilled in the art that many variations are possible without departure from the scope of the invention. It is intended, therefore, to be limited only by the following claims.

What is claimed is:

1. A process for the extraction of beryllium values from non-pegmatic beryllium-containing ores which comprises passing sulfur trioxide through a mass of beryllium containing ore in finely divided form, said ore being at a temperature between about 560° C. and about 750° C., adding water to the sulfatized material to form a slurry, adjusting the pH of said slurry to a value of from about 2.0 to about 4.5, and separating the pregnant leach solution containing dissolved beryllium sulfate values from the insoluble residue.

2. A process as claimed in claim 1, wherein the contact time for said sulfatization is at least 3 minutes.

3. A process as claimed in claim 1, wherein said ore is maintained at a temperature between 580° C. and 610° C. during said sulfatization.

4. A process for the extraction of beryllium values from magnetite and bentonite ores which comprises passing sulfur trioxide through a mass of said ore in finely divided form, said ore being at a temperature between about 560° C. and about 750° C. adding water to the sulfatized material to form a slurry, adjusting the pH of said slurry to a value of from about 2.0 to about 4.5, and separating the pregnant leach solution containing dissolved beryllium sulfate values from the insoluble residue.

References Cited in the file of this patent

UNITED STATES PATENTS 2,036,015     Broderick et al.            Mar. 31, 1936

OTHER REFERENCES

Hurlbut: "Dana's Manual of Mineralogy," 17th Ed., John Wiley and Sons, Inc., New York, 1959, pages 310–312.